(12) United States Patent
Gagne et al.

(10) Patent No.: US 9,518,510 B2
(45) Date of Patent: Dec. 13, 2016

(54) BLOWER FOR USE WITH AIR PARTICLE SEPARATOR

(71) Applicant: ROLLS-ROYCE NORTH AMERICAN TECHNOLOGIES, INC., Indianapolis, IN (US)

(72) Inventors: Steven Gagne, Avon, IN (US); George A. Pontones, Indianapolis, IN (US); Mark J. Blackwelder, Plainfield, IN (US)

(73) Assignee: ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 186 days.

(21) Appl. No.: 14/367,504

(22) PCT Filed: Dec. 30, 2012

(86) PCT No.: PCT/US2012/072229
§ 371 (c)(1),
(2) Date: Jun. 20, 2014

(87) PCT Pub. No.: WO2013/102169
PCT Pub. Date: Jul. 4, 2013

(65) Prior Publication Data
US 2015/0322906 A1 Nov. 12, 2015

Related U.S. Application Data

(60) Provisional application No. 61/581,834, filed on Dec. 30, 2011.

(51) Int. Cl.
*B01D 45/12* (2006.01)
*F02C 7/052* (2006.01)
(Continued)

(52) U.S. Cl.
CPC ............ *F02C 7/052* (2013.01); *B01D 46/0002* (2013.01); *F02M 35/086* (2013.01); *B01D 2279/60* (2013.01)

(58) Field of Classification Search
CPC .. F02C 7/052; B01D 46/0002; B01D 2279/60; F02M 35/086
See application file for complete search history.

(56) References Cited

U.S. PATENT DOCUMENTS 3,421,296 A   1/1969   Beurer
3,695,006 A * 10/1972   Valbona ................... A47L 5/24
                                                        15/319

(Continued)

FOREIGN PATENT DOCUMENTS

EP       1978222 A2      10/2008
WO    2007/081817 A2     7/2007
WO     2007081817 A2     7/2007

OTHER PUBLICATIONS

PCT International Search Report and Written Opinion completed by the ISA/US on Feb. 11, 2013 and issued in connection with PCT/US2012/072229.

(Continued)

*Primary Examiner* — Dung H Bui
(74) *Attorney, Agent, or Firm* — Barnes & Thornburg, LLP

(57) ABSTRACT

An apparatus including an internal combustion engine receiving air from an air particle separator is disclosed. The air particle separator has an air intake capable of receiving air and a particulate matter conveyed by the air, the particle separator being capable of filtering the particulate matter from the air to produce a clean flow and a dirty flow. The clean flow is provided to the inlet of the internal combustion engine. A bladed component is in fluid communication with the dirty flow and includes a plurality of members operable (Continued)

to assist the dirty flow in being conveyed from the particle separator. The bladed component rotates about an axis and has an annular construction disposed radially outward of the plurality of members configured to receive a circumferential force to cause the bladed component to rotate about the axis.

15 Claims, 3 Drawing Sheets

(51) Int. Cl.
    *B01D 46/00*     (2006.01)
    *F02M 35/08*     (2006.01)

(56) References Cited

U.S. PATENT DOCUMENTS

| | | | |
|---|---|---|---|
| 4,002,024 A | | 1/1977 | Nye et al. |
| 4,046,527 A | * | 9/1977 | Kistemaker ............ B01D 53/24 376/121 |
| 4,304,094 A | | 12/1981 | Amelio |
| 4,949,022 A | | 8/1990 | Lipman |
| 6,333,003 B1 | * | 12/2001 | Katano ................... F24F 3/161 118/326 |
| 8,152,881 B2 | * | 4/2012 | Chen ....................... F04D 25/08 55/385.6 |
| 8,152,907 B2 | * | 4/2012 | Moriya .............. B01D 46/0023 55/282.3 |
| 2002/0122723 A1 | | 9/2002 | Care et al. |
| 2008/0141649 A1 | | 6/2008 | Petrowicz et al. |
| 2011/0265650 A1 | | 11/2011 | Kazlauskas et al. |

OTHER PUBLICATIONS

International Preliminary Report on Patentability and Written Opinion, International Application No. PCT/US2012/072229, May 12, 2015, 7 pages.

* cited by examiner

BLOWER FOR USE WITH AIR PARTICLE SEPARATOR

CROSS-REFERENCE TO RELATED APPLICATIONS

This application is a U.S. national counterpart application of international application serial No. PCT/US2012/072229 filed Dec. 30, 2012, which claims priority under 35 U.S.C. §119(e) to U.S. Provisional Patent Application No. 61/581,834, filed Dec. 30, 2011, the entire disclosures of which are incorporated herein by reference.

FIELD OF THE INVENTION

The present invention generally relates to air particle separators, and more particularly, but not exclusively, to a fluid moving machine in fluid communication with an air particle separator.

BACKGROUND

Providing internal combustion engines with clean air from air particle separation remains an area of interest. The use of engines in less than desirable conditions (e.g. air containing a high amount of particulate matter), among other possible situations, can result in a need and/or desire to condition the air prior to the air entering the engine. Some existing systems have various shortcomings relative to certain applications. Accordingly, there remains a need for further contributions in this area of technology.

SUMMARY

One embodiment of the present invention is a unique air particle separator and fluid moving machine arrangement. Other embodiments include apparatuses, systems, devices, hardware, methods, and combinations for removing or aiding in the removal of a dirty air flow from an air particle separator. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION OF THE DRAWINGS

Figure 1:
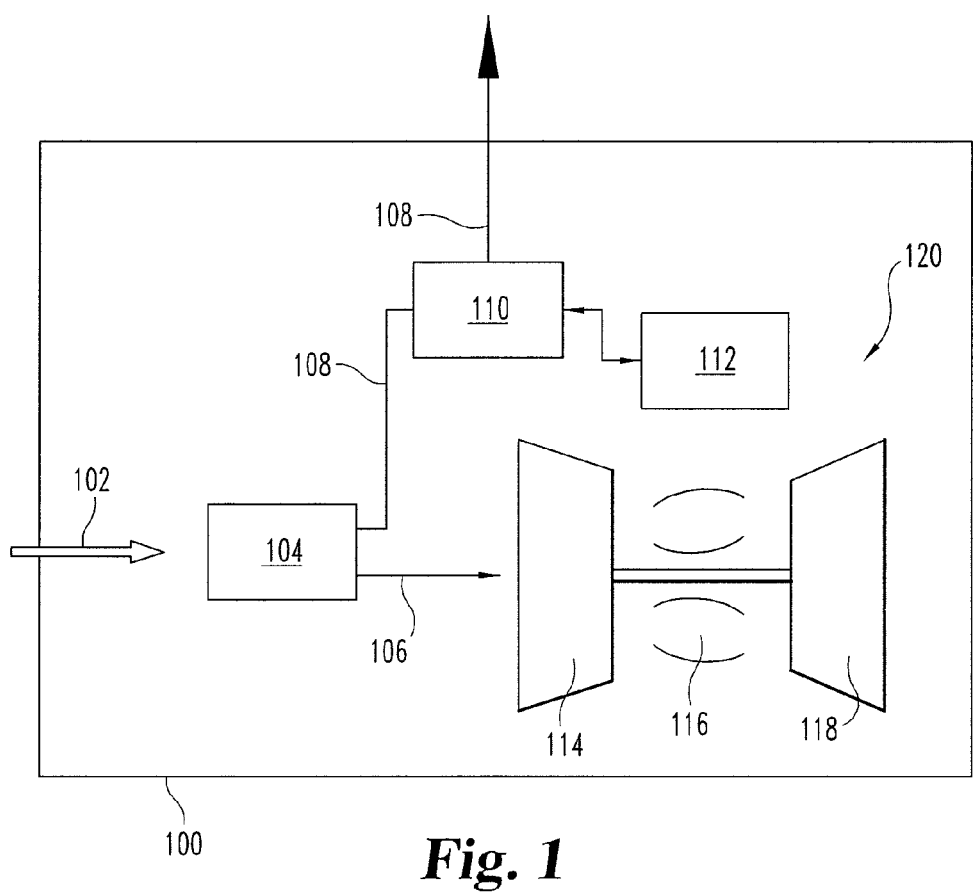
FIG. 1 depicts an embodiment of a gas turbine engine having an air particle separator arrangement in communication with a fluid moving machine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment is disclosed of an internal combustion engine 120 coupled with an air particle separator 104 capable of providing a clean air stream 106 to the internal combustion engine 120. The internal combustion engine 120 can take a variety of forms including, but not limited to, reciprocating engines, rotary engines, gasoline engines, and diesel engines. In one particular embodiment, the internal combustion engine can take the form of a gas turbine engine. Many different embodiments are envisioned for the gas turbine engine such as, but not necessarily limited to, turboprop, turboshaft, or turbofan engines. The gas turbine engine 120 of the illustrated embodiment includes a compressor 114, combustor 116, and turbine 118 and is depicted as a single spool engine, though a greater number of spools are contemplated in other embodiments. In some forms the gas turbine engine 120 is capable of providing power to rotate a shaft which can be coupled to a variety of devices such as, but not limited to, a generator 112, to set forth just one non-limiting example.

In some applications, the gas turbine engine 120 can alternatively and/or additionally be used to provide power to an aircraft 100. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that cannot be coupled with an aircraft such as, for example, industrial applications, power generation, pumping sets, naval propulsion, surface vehicles, weapon systems, security systems, perimeter defense/security systems, and the like known to one of ordinary skill in the art.

Figure 2:
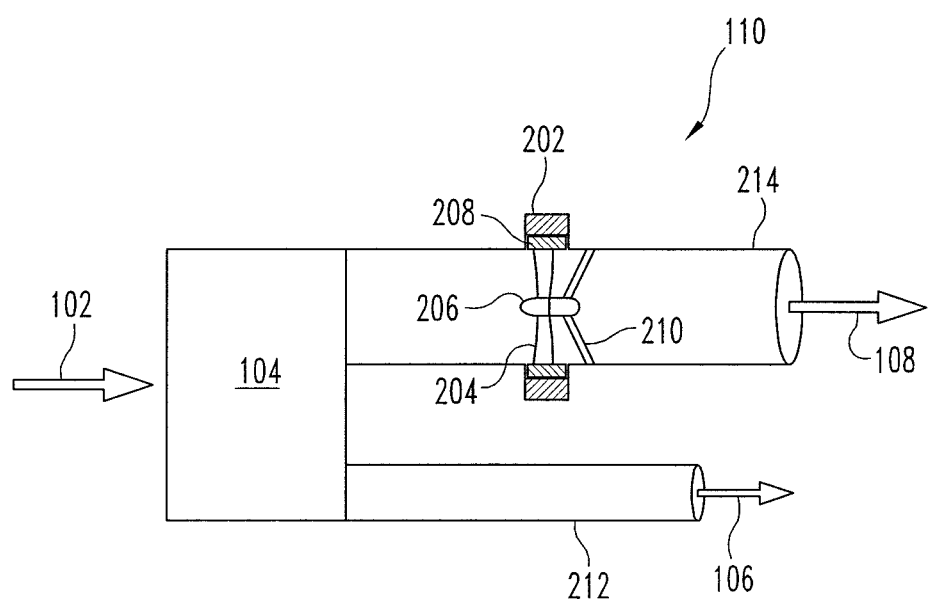
FIG. 2 depicts an embodiment of an air particle separator arrangement in communication with a fluid moving machine in the form of an electrically driven motor.

The air particle separator 104 included in the embodiment of FIG. 1 is used to filter particulate matter such as sand, dirt, and dust along with other foreign objects from an inlet air stream 102 so that a clean air stream 106 can be used within the rotating turbomachinery of the gas turbine engine 120 depicted in the illustrated embodiment. The air particle separator 104 can be used to completely and/or partially clean the inlet air stream 102 and can accordingly separate the inlet air stream 102 into a relatively clean air stream 106 and a dirty air flow 108. Referring generally to the air particle separator 104 as shown in FIGS. 1-2, as particulate matter and/or other foreign objects enter through the inlet air stream 102 of the gas turbine engine 120 they can encounter a body forming a flow path geometry in some forms of the inlet particle separator. The body, which can take the form of a scroll type air particle separator 104, can be structured to turn and separate the incoming flow path into the clean air stream 106 and the dirty air flow 108. The relative turning between the clean air stream 106 and the dirty air flow 108 can encourage the particulate matter and other foreign objects to enter the dirty air flow 108 by virtue of momentum effects thus creating the dirty air flow 108. The air particle separator 104 can include a variety of shapes, sizes, orientations, etc. useful in the separation of the clean air stream 106 and the dirty air flow 108 that are delivered through the clean air duct 212 and dirty air duct 214, respectively. In addition, various other air particle separators 104 operating on the basis of a variety of physical phenomena can be utilized in addition or in lieu of embodiments of the separator discussed above. The clean air duct 212 is routed to provide the clean air stream 106 to the internal combustion engine, shown as the gas turbine engine 120 in the illustrated embodiment, and the dirty air duct 214 is routed to carry away the dirty air flow 108 from the engine.

The dirty air duct 214 is in fluid communication with a circumferentially driven blower 110 that can include a blade 204, or a plurality of blades 204, to aid in the removal of the dirty air flow 108. The blower 110 can take a variety of forms including centrifugal flow, axial flow, etc., and can be operated at a variety of speeds. The blades 204 or other structure configured to move the dirty air flow 108 can have a variety of shapes, configurations, orientations, etc and in one form are disposed upon a central hub 206.

The circumferentially driven blower 110 can be configured to rotate based upon a force received at a radially outer portion of the blower 110. For example, the force can be at an outer periphery of the rotating blower 110, but can also be located on an outer portion whether or not at the outermost periphery. In some forms, the driven portion of the blower 110 can be confined in an area radially outward of the portion that receives the dirty air flow 108, but any variation of the blower 110 that receives a force radially outward of its center of rotation is contemplated herein.

The circumferentially driven blower 110 can be configured to provide fluidic assistance in conveying particulate matter and/or foreign objects away from the air particle separator 104. Many different embodiments are envisioned to accomplish the fluidic assistance. In the illustrated embodiment, the circumferentially driven blower 110 is disposed in line with the dirty air duct 214 such that the blades of the blower 110 are located internal to the dirty air duct 214 and thus in possible contact with particulate matter and/or foreign objects. The blades can extend to an outer diameter of the dirty air duct 214, and in some forms the blades can extend past the outer diameter of the dirty air duct 214. Thus, in some forms at least part of the blades are not located within the duct 214 used to convey the particulate matter and/or foreign objects.

In one form, the plurality of blades 204 of the circumferentially driven blower 110 includes a plurality of blade tips coupled to a rim 208. The rim 208 can be located radially outward of one or more of the blades 204 and, in some forms, circumferentially extends around all blades 204. The rim 208 can lie in a channel such that the rim 208 lies substantially outside of the dirty air flow 108 as is depicted in FIG. 2. However, in further forms, the rim 208 can be included internal to the dirty air duct 214 such that the rim 208 lies within the dirty air flow 108.

A rim of the circumferentially driven blower 110 can be configured to receive a motive force as a result of operation of an electric machine. Various embodiments can be contemplated herein. In the illustrated embodiment, the circumferentially driven blower 110 is in the form of an integrated electric machine which can convert electrical energy into mechanical energy to rotate the blades 204 about an axis of rotation. The rim 208 can be incorporated into the electric machine and be driven by it to form part of an electric motor. Various types and/or configurations of electric machines can be utilized to drive the circumferentially driven blower 110. To set forth just a few non-limiting examples, the circumferentially driven blower 110 can be a synchronous or asynchronous motor, can utilize alternating current or direct current, and can be a permanent magnet machine, a brush-type machine, an induction machine, a reluctance machine, an electrostatic machine, or a homopolar machine, among other variations. The electric machine can be single speed, variable speed, or continuously variable speed and/or can have an output which is attached to a transmission to achieve a variable speed and/or continuously variable speed. In some forms, the circumferentially driven blower 110 can operate at a constant speed while the gas turbine engine 120 is operational. In other forms, the circumferentially driven blower 110 can be in communication with a controller which varies the speed of the circumferentially driven blower 110 in response to conditions such as amount of debris in the inlet air stream 102, power demand of the gas turbine engine 120, or other flow and/or air quality variables.

The illustrative embodiment of FIG. 2 depicts the circumferentially driven blower 110 having the rim 208 acting as a rotor of an electric machine that includes a stator 202 disposed radially outward of the rotor. One or both of the rotor and stator can have a magnetic field that are caused to change, through electric current variations, as the motor is rotated. The stator 202 can be located radially outward from the driven rim 208 and in the illustrated embodiment is located outside of the dirty air duct as is depicted in FIG. 2. In other forms, the stator 202 is located radially outward from the driven rim 208, but can be incorporated into a side-wall of the dirty air duct 214 or can be included inside an inner diameter of the dirty air duct 214 at least partially in line with the dirty air flow 108.

In one form, the stator 202 includes a plurality of windings useful to conduct electricity to provide motive force to rotate the blower 110. In some forms, the force can be developed to move the blower 110 through the formation of a magnetic field or magnetic pulse. The windings of the stator 202 can be of various configurations, cross-sections, and geometries, among other attributes, that can include, but not be limited to, drum windings, lap windings, wave windings, among others. To set forth just a few more non-limiting attributes, the blower 110 can be configured to have separately excited windings, straight shunt windings, series windings, and possible combinations thereof, among potential others.

The driven rim 208 of the blower 110 acting as the rotor of the electric machine can be configured as a magnetic rim. The magnetic rim can be an integrated device having a plurality of magnetic portions. In some forms the rim 208 can contain a plurality of individual magnets housed within the driven rim 208, but can be an electro-magnet in other non-limiting forms, or can include any other magnetic array. In additional and/or alternative forms, the magnetic parts of the rotor can be separately located or in an abutment relationship with each other. The magnetic parts can be located at a variety of radial positions relative to the axis of rotation of the blower 110 and in some forms can be located either in the inner portion of the duct 214 or an outer portion thereof. In still further forms, the magnetic parts can be exposed to the dirty air flow 108. The magnetic part of the blower 110 can include permanent magnets, semi-permanent magnets, and/or electromagnets.

In one form, it is contemplated that the circumferentially driven blower 110 is of a wound-rotor configuration. In one example of this form, a plurality of windings can be located radially outward of the blades 204 and can be attached to the driven rim 208. The stator 202 can include a magnetic portion, such as a permanent magnet, semi-permanent magnet, and/or electro-magnet. In this configuration, when excited by an electric current, the driven rim 208 can produce a magnetic field and/or pulse. The magnetic field produced by the stator 202 will interact with the magnetic field and/or pulse produced by the driven rim 208 thereby causing rotation of the driven rim 208 and the blades 204 attached thereto.

Electricity can be provided to the blower 110 from a generator 112 driven by the gas turbine engine 120, among other possible sources. In other additional and/or alternative forms, electricity is supplied to the stator 202 from an electrical energy storage device such as a lithium-ion battery pack, a lead-acid battery, a super-capacitor, or other device capable of storing electrical energy.

The circumferentially driven blower 110 can include a central hub 206 which in some embodiments can provide a central mounting point for the blade 204. In some forms, the central hub 206 is configured to receive a root of one or more of the blades 204. For example, a root of the blade can be bonded, affixed, or otherwise attached to the hub 206. In a still further example, the blade 204 can be made integral with the hub 206. The central hub 206 can take the shape of an aerodynamic fairing to facilitate passage of the dirty air flow 108, but other shapes whether or not aerodynamically desirable are also contemplated. In other forms, the central hub 206 can take on any suitable configuration which allow for a joining of a plurality of blades 204 to extend radially outward therefrom.

In one form, the central hub 206 can include a central hub bearing which can be used to support and/or constrain a rotational movement of the central hub 206 and blades 204 relative to a stationary mounting point. The central hub bearing can take a variety of forms such as a bushing, a journal bearing, a rolling-element bearing, a jewel bearing, a magnetic bearing, a fluid bearing, or a flexure bearing, among other structures, which allow for the support and/or constraint of a rotational movement. In other forms, the rim 208 can have a bearing structure surrounding the outer diameter of the rim 208. Non-limiting examples of this bearing structure include, but are not limited to, a ball bearing configuration, roller bearings, sleeve bearings, and rifle bearings, among other friction reduction devices.

The central hub 206 can also be coupled to a strut 210 that extends to a stationary mounting point. While the embodiment of FIG. 2 depicts two struts 210, it is contemplated that any number of struts 210 can be utilized. Non-limiting examples of the stationary mounting point to which the strut 210 can be attached include an inner diameter of the dirty air duct 214, an outer diameter of the dirty air duct 214, a portion of the air particle separator 104, among other stationary mounting locations. In one form, the strut 210 can be an airfoil member disposed upstream or downstream (as depicted in FIG. 2) of the blades 204. In one form, the strut is disposed downstream of the blades 204 and stabilizes the central hub 206 allowing the blades 204 to rotate on the central hub bearing. The strut 210 can be a vane located upstream of the blades 204 which alters a flow of the dirty air flow 108 prior to the entrance of the dirty air flow 108 into the blades 204.

Figure 3:
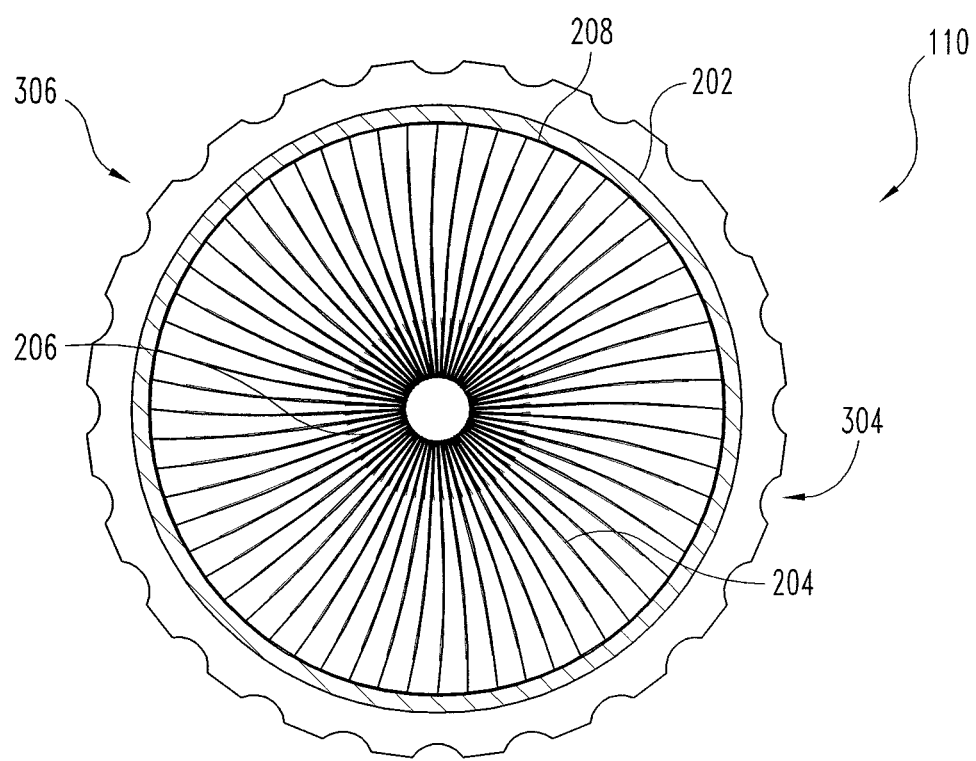
FIG. 3 depicts an embodiment of a fluid moving machine in the form of an electrically driven motor.

A housing 306 can encompass the stator 202 and a channel for the driven rim 208, as depicted in FIG. 3. The plurality of blades 204 and central hub bearing are located in an inner diameter of the housing 306. The housing 306 can be integrated into the dirty air duct 214 such that an inner diameter of the housing 306 forms a portion of the flowpath of the dirty air duct 214. The strut 210, extending from the central hub, can be coupled to an inner diameter of the housing 306 such that the housing encompasses the entirety of the circumferentially driven blower 110. In one form, the plurality of windings are located toward an inner diameter of the housing 306.

A plurality of cooling channels 304 can be located radially outside the stator 202. The cooling channels 304 can be located between protrusions from an outer periphery of the housing 306 to form fins or channels that increase the surface area of the outer periphery and, therefore, increase the heat transfer from the outer periphery. The housing and cooling channels 304 can be constructed of a material having a high thermal conductivity such that heat from the windings of the stator 202 can readily be transferred into the environment. The plurality of cooling channels 304 can receive a portion of cooling air which bypasses air inlet 102, or a working fluid from any suitable source.

One aspect of the present application provides an apparatus, including an air particle separator having an air inlet capable of receiving an air carrying a particulate matter, the air particle separator also having a first air outlet and a second air outlet, each structured to flow portions of the air received by the air inlet, the first air outlet structured to flow a higher concentration of particulate matter than the second air outlet. The apparatus further includes an air moving device in fluid communication with the first air outlet having a rotatable air moving member capable of producing a pressure change to facilitate movement of the particulate matter carried by the air through the first air outlet, the air moving device structured to receive a rotating force at a force receiving portion located radially outward of a portion of the air moving member. The apparatus further includes an internal combustion engine having an air inlet in fluid communication with the second air outlet.

One feature of the present application provides wherein the internal combustion engine is a gas turbine engine, and wherein the air moving device includes an electric motor.

Another feature of the present application provides wherein the air moving device further includes a plurality of air moving members extending radially outward from a central hub, each of the plurality of air moving members includes a blade tip operably coupled to a rim, and wherein the rim includes a magnetic portion located outside a working flow path of the air to be expelled from the first air outlet.

Yet another feature of the present application provides wherein the air moving device further includes a stator of an electric machine located radially outward of the air moving member and wherein the force receiving portion further comprises a rotor of the electric machine.

Still yet another feature of the present application provides wherein the stator further includes a housing having wound coils located between the housing and the rotor.

Another feature of the present application provides wherein the housing further includes a cooling surface located on a periphery of the housing radially outward from the coils.

Yet another feature of the present application provides wherein the cooling surface includes a plurality of cooling channels.

Still yet another feature of the present application further includes a center hub having a plurality of air moving members extending radially therefrom.

Another feature of the present application provides wherein the center hub is a center bearing hub having a strut extending from the hub and fixed to a static structure, the strut located downstream of the air moving device, and wherein the air moving device includes a plurality of airfoil members.

Another aspect of the present application provides an apparatus, including an internal combustion engine having an inlet structured to receive air from a particle separator, the particle separator having an air intake capable of receiving an air and a particulate matter conveyed by the air, the particle separator capable of filtering the particulate matter from the air to produce a clean flow and a dirty flow, the clean flow providing the air received via the inlet of the internal combustion engine. The apparatus further includes a bladed component in fluid communication with the dirty flow and having a plurality of members operable to assist the dirty flow in being conveyed from the particle separator, the bladed component structured to rotate about an axis and having an annular construction disposed radially outward of the plurality of members configured to receive a circumferential force to react the bladed component and cause it to rotate about the axis.

One feature of the present application provides wherein the annular construction is a component of an electric motor disposed radially outside of the dirty flow, the annular construction having a magnetic portion.

Another feature of the present application provides wherein the electric motor includes a cooling surface having a plurality of radially extending members.

Yet another feature of the present application includes a second annular construction located radially outward of the annular construction.

Still yet another feature of the present application provides wherein the second annular construction is an electrical device that assists in imparting force to the bladed component through electromagnetic interactions with the annular construction.

A further aspect of the present application provides an apparatus, including an air particle separator having an air inlet, a clean air outlet, and a debris outlet, wherein the clean air outlet is in fluid communication with an air intake of a gas turbine engine. The apparatus further includes a bladed component capable of rotating at a speed to produce a velocity change in a fluid that traverses the debris outlet to facilitate movement of the fluid and debris therein. The apparatus further includes means for rotating the bladed component.

One feature of the present application further includes means for cooling the means for rotating the bladed component.

Yet a further aspect of the present application provides a method, including receiving a flow of working fluid and debris into an inlet of an internal combustion engine, separating the debris from the working fluid in a particle separator to create a clean flow through a clean flow duct and a dirty flow through a dirty flow duct, providing a motive force to the dirty flow via action of a turbomachinery component, and applying a rotating force to a portion of the turbomachinery component at a location in proximity to the periphery of the dirty flow duct.

One feature of the present application provides wherein applying a rotating force to a portion of the turbomachinery component includes supplying an electric current to a stator located radially outward of the turbomachinery component and inducing a magnetic field on the turbomachinery component, thereby rotating the turbomachinery component.

Another feature of the present application provides wherein inducing a magnetic field on the turbomachinery component further includes providing a driven rim on a blade tip of the turbomachinery component and supplying the electric current to a series of windings comprising the stator.

Yet another feature of the present application further includes providing the clean flow to an air intake of a gas turbine engine.

Still yet another feature of the present application further includes passing a portion of cooling air over a plurality of radially extending members located radially outward of the series of windings.

Another feature of the present application further includes suspending the turbomachinery component with a center hub bearing.

Yet another feature of the present application provides wherein supplying the electric current further includes supplying the electric current from one of a generator driven by the gas turbine engine and an electrical storage device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described can be more desirable, it nonetheless may not be necessary and embodiments lacking the same can be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
   an air particle separator having an air inlet capable of receiving an air carrying a particulate matter, the air particle separator also having a first air outlet and a second air outlet, each structured to flow portions of the air received by the air inlet, the first air outlet structured to flow a higher concentration of particulate matter than the second air outlet, the second air outlet in fluid communication with an air intake of an internal combustion engine; and
   an air moving device in fluid communication with the first air outlet having a rotatable air moving member capable of producing a pressure change to facilitate movement of the particulate matter carried by the air through the first air outlet, the air moving device structured to receive a rotating force at a force receiving portion located radially outward of a portion of the air moving member, wherein the rotatable air moving member is positioned in an air duct fluidly coupled with the first air outlet, the air moving device further includes an annular stator arranged externally around the air duct and aligned axially with the air moving device; and
   the stator is configured to cause the rotating force to be applied to the force receiving portion of the air moving device through electromagnetic interactions to cause rotation of the rotatable air moving member.

2. The apparatus of claim 1, wherein the internal combustion engine is a gas turbine engine, and wherein the air moving device includes an electric motor.

3. The apparatus of claim 2, wherein the air moving device further includes a plurality of air moving members extending radially outward from a central hub, each of the plurality of air moving members includes a blade tip operably coupled to a rim, and wherein the rim includes a magnetic portion located outside a working flow path of the air to be expelled from the first air outlet.

4. The apparatus of claim 1, wherein the stator includes a housing and the housing further includes a cooling surface located on a periphery of the housing.

5. The apparatus of claim 4, wherein the cooling surface includes a plurality of cooling channels.

6. The apparatus of claim 1, which further includes a center hub having a plurality of air moving members extending radially therefrom.

7. The apparatus of claim 6, wherein the center hub is a center bearing hub having a strut extending from the hub and fixed to a static structure, the strut located downstream of the air moving device, and wherein the air moving device includes a plurality of blades.

8. An apparatus, comprising:
an internal combustion engine having an inlet structured to receive air from a particle separator, the particle separator having an air intake capable of receiving air and a particulate matter conveyed by the air, the particle separator capable of filtering the particulate matter from the air to produce a clean flow and a dirty flow, the clean flow providing the air received via the inlet of the internal combustion engine, and the dirty flow being routed through an air duct; and
a bladed component in fluid communication with the dirty flow and having a plurality of members operable to assist the dirty flow in being conveyed from the particle separator, the bladed component structured to rotate about an axis and having an annular construction disposed radially outward of the plurality of members and configured to receive a circumferential force to react the bladed component and cause it to rotate about the axis,
wherein the apparatus further includes an annular stator located radially outside of the air duct and aligned axially with the annular construction and the annular stator is configured to cause the circumferential force through electromagnetic interactions with the annular construction.

9. The apparatus of claim 8, wherein the annular construction is a component of an electric motor disposed radially outside of the dirty flow, the annular construction having a magnetic portion.

10. The apparatus of claim 9, wherein the electric motor includes a cooling surface having a plurality of radially extending members.

11. An apparatus, comprising:
an air particle separator having an air inlet, a clean air outlet, and a debris outlet, wherein the clean air outlet is in fluid communication with an air intake of a gas turbine engine and the debris outlet is in fluid communication with an air duct;
a bladed component capable of rotating at a speed to produce a velocity change in a fluid that traverses the debris outlet to facilitate movement of the fluid and debris therein, the bladed component being disposed in line with the air duct; and
means for rotating the bladed component, wherein the means for rotating the bladed component includes a stator arranged circumferentially around the bladed component and arranged radially outside of the air duct, and the stator is configured to interact with the bladed component through electromagnetic interactions to cause rotation of the bladed component.

12. The apparatus of claim 11, which further includes means for cooling the means for rotating the bladed component.

13. A method, comprising:
receiving a flow of working fluid and debris into an inlet of an internal combustion engine;
separating the debris from the working fluid in a particle separator to create a clean flow through a clean flow duct and a dirty flow through a dirty flow duct;
providing a motive force to the dirty flow via action of a turbomachinery component disposed in line with the dirty flow duct; and
applying a rotating force to a portion of the turbomachinery component at a location in proximity to a periphery of the dirty flow duct,
wherein applying the rotating force to the portion of the turbomachinery component includes supplying an electric current to an annular stator aligned axially with the turbomachinery component and located radially outward of the dirty flow duct and inducing a magnetic field.

14. The method of claim 13, wherein inducing the magnetic field on the turbomachinery component further includes interacting a magnetic field of a rotor with the magnetic field created by the supplying of the electric current to a series of windings located in the stator.

15. The method of claim 14, which further includes providing the clean flow to an air intake of a gas turbine engine.

* * * * *